(12) United States Patent
Baier et al.

(10) Patent No.: US 7,751,775 B2
(45) Date of Patent: Jul. 6, 2010

(54) METHOD FOR TRANSMITTING MESSAGES BY RADIO WHILE USING A REPEATER

(75) Inventors: Paul Walter Baier, Kaiserslautern (DE); Tobias Weber, Rostock (DE); Martin Weckerle, Ulm (DE); Wolfgang Zirwas, München (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 191 days.

(21) Appl. No.: 11/793,503

(22) PCT Filed: Nov. 24, 2005

(86) PCT No.: PCT/EP2005/056201

§ 371 (c)(1),
(2), (4) Date: May 11, 2008

(87) PCT Pub. No.: WO2006/067019

PCT Pub. Date: Jun. 29, 2006

(65) Prior Publication Data

US 2008/0261518 A1 Oct. 23, 2008

(30) Foreign Application Priority Data

Dec. 20, 2004 (DE) .................. 10 2004 061 342

(51) Int. Cl.
*H04B 3/36* (2006.01)
(52) U.S. Cl. .................. 455/7; 455/412.2; 455/11.1; 455/500
(58) Field of Classification Search ............ 455/11.1, 455/502, 500, 412.2, 452.1, 458, 13.2, 16, 455/517, 59, 412.1, 414.1, 7; 370/338
See application file for complete search history.

(56) References Cited

U.S. PATENT DOCUMENTS

| 7,536,167 | B2 * | 5/2009 | Gollnick et al. | .......... 455/343.4 |
| 2005/0014464 | A1 * | 1/2005 | Larsson | .................. 455/11.1 |
| 2007/0160014 | A1 * | 7/2007 | Larsson | .................. 370/338 |

FOREIGN PATENT DOCUMENTS

WO WO 2004/107693 A 12/2004

OTHER PUBLICATIONS

Rankov B et al: "On the capacity of relay-assisted wireless MIMO channels" Signal Processing Advances in Wireless Communications, 2004 IEEE 5th Workshop on Lisbon, Portugal Jul. 11-14, 2004; Piscataway, NJ, USA, IEEE, 11. Jul. 2004, pp. 323-327, XP010806099, ISBN: 0-7803-8337-0, Abstract; Figure 1, section [0II.].
Baier P W et al: "Joint transmission (JT), an alternative rationale for the downlink of time division CDMA using multi-element transmit antennas" Spread Spectrum Techniques and Applications, 200 IEEE Sixth International Symposium on Sep. 6-8, 2000; Piscataway, NJ, USA, IEEE, Band 1, 6. Sep. 2000, pp. 1-5, XP010517508, ISBN: 0-7803-6560-7, Abstract.
Wang, H.: Cooperative transmission in wireless networks with delay constraints. Wireless Communications and Networking Conference, 2004. WCNC. 2004 IEEE vol. 3, Mar. 21-25, 2004 pp. 1933-1938.
Janani, M.; Hedayat, A.; Hunter, T.E.; Nosratinia, A.: Coded cooperation in wireless communications: space-time transmission and iterative decoding., IEEE Transactions on Signal Processing, vol. 52, Issue 2, Feb. 2004 pp. 362-371.

* cited by examiner

*Primary Examiner*—John Lee
(74) *Attorney, Agent, or Firm*—Staas & Halsey LLP

(57) ABSTRACT

A method transmits a message by radio from a transmitter to a receiver. In a first step, the transmitter transmits the message to a forwarding station. In a second step, the message is subsequently transmitted at the same time from the transmitter and the forwarding station to the receiver. A transmitter carries out the method.

11 Claims, 2 Drawing Sheets

METHOD FOR TRANSMITTING MESSAGES BY RADIO WHILE USING A REPEATER

CROSS REFERENCE TO RELATED APPLICATIONS

This application is based on and hereby claims priority to PCT Application No. PCT/EP2005/056201 filed on Nov. 24, 2005 and European Application No. 10 2004 061 342.7 filed on Dec. 20, 2004, the contents of which are hereby incorporated by reference.

BACKGROUND

The invention relates to a method and a transmitter for transmitting a message by radio from a transmitter to a receiver, the transmitter transmitting the message to a radio station for message forwarding.

In radio communication systems, messages, for example comprising voice information, image information, video information, SMS (Short Message Service), MMS (Multimedia Messaging Service) or other data, are transmitted with the aid of electromagnetic waves via a radio interface between transmitting and receiving radio station. Depending on the specific embodiment of the radio communication system, the radio stations here can be various types of subscriber-side radio stations or network-side radio devices such as repeaters or radio access points such as base stations. In a mobile radio communication system, at least some of the subscriber-side radio stations are mobile radio stations. The electromagnetic waves are emitted using carrier frequencies which lie in the frequency band provided for the respective system.

Mobile radio communication systems are often configured as cellular systems e.g. in conformance with the GSM (Global System for Mobile Communication) or UMTS (Universal Mobile Telecommunications System) standard, with a network infrastructure including e.g. of base stations, devices for monitoring and controlling the base stations and further network-side devices. Apart from these cellular, hierarchical radio networks organized on a wide-area (supralocal) basis, standards for WLANs are HiperLAN, DECT, IEEE 802.11, Bluetooth and WATM.

Radio stations can communicate directly with one another only if they are both located in the radio coverage range of the other radio station respectively. If direct communication is not possible or, on account of the distance between the radio stations, is possible only with poor quality, then messages between these radio stations can be transmitted via other radio stations which—by forwarding the messages—function as relay radio stations or repeaters. This type of message forwarding can, depending on the specific embodiment of the radio communication system, be carried out both by subscriber radio stations and by network-side radio stations. Messages can be forwarded, for example, in a WLAN between a radio access point and subscriber radio stations located far from the radio access point. Also, in an adhoc mode of a radio communication system, subscriber radio stations can communicate with one another via one or more hops (hop or multihop) without intermediary devices such as e.g. base stations or radio access points being connected between them.

Document WO 2004/107693 A1 describes a communication between a base station and a mobile station via two individual connections: a first connection between the base station and a relay, and a second connection between the relay and the mobile station. A channel estimation is carried out for both individual connections. The forwarding of messages to the mobile station by the relay is subsequently adapted to the channel estimation of the first connection and preferably also to that of the second connection.

The document

B. Rankow, A Wittneben: "On the capacity of relay-assisted wireless MIMO channels", July 2004 IEEE 5$^{th}$ Workshop on signal processing advances in wireless communications, XP10806099 describes a method for radio communication using relays. Here, the source transmits in the first time slot a first signal to the destination and to the relay. In the second time slot, the relay forwards the first signal to the destination and the source simultaneously transmits a second signal to the destination.

SUMMARY

One possible object is to disclose a method for transmitting a message in a radio communication system which uses repeaters for forwarding messages. Furthermore, a device is to be disclosed for carrying out the method.

The inventors propose a method for transmitting a message by radio from a transmitter to a receiver, in which, in a first step the transmitter transmits the message to a forwarding station. In a second step the message is subsequently transmitted at the same time from the transmitter and the forwarding station to the receiver.

The transmitter is preferably a network-side radio station such as e.g. a base station or a radio access point of a local radio communication system; the receiver can be a subscriber station. The receiver does not have to be the ultimate recipient of the message, it can optionally forward the received message. The forwarding station serves to forward radio messages and can thus be mobile or stationary, on the network side or on the subscriber side.

The message is transmitted at the same time from the transmitter to the receiver and from the forwarding station to the receiver. This can be achieved by the message being transmitted by the transmitter and the forwarding station simultaneously or else time-shifted relative to one another. The messages which the receiver receives from the transmitter and which the receiver receives from the forwarding station overlap at least partially. Consequently an at least partial superimposition of the two messages transmitted by the transmitter and the forwarding station takes place in the receiver.

In a further development, the transmitter receives prior to the first step a second message, in particular a pilot message known to the transmitter, on the one hand directly from the receiver and on the other from the forwarding station which has received the second message beforehand from the receiver. The method according to this further development can be carried out prior to each message transmission in accordance with the first step, but it is also possible for the method according to this further development to be used for multiple message transmissions according to the first step. The two receipts of the second message by the transmitter preferably occur consecutively, not simultaneously. In this way, the receiver can transmit the second message by a single dispatch to both the transmitter and the forwarding station, whereupon the forwarding station forwards the second message to the transmitter.

Preferably, a channel estimation is carried out using the twice-received message. The channel estimation is preferably carried out by the transmitter. It relates to the radio channel between the receiver and the transmitter, whereby the forwarding of messages by the forwarding station is included in this radio channel.

In an embodiment, the transmitter carries out, prior to the message transmission of the first step, a processing of the message using a result of the channel estimation. In this way, the transmitter can utilize for example the knowledge which it has acquired about the radio channel from the channel estimation to distort the signals containing the message such that during the transmission to the receiver the radio channel clears the distortion so that a high-quality signal reaches the receiver. The receiver can optionally dispense with its own channel estimation for distorting the received signal. The processing of the message is preferably carried out within the framework of a joint-transmission method. Here, the transmitter takes into account the mutual influence of various signals transmitted by it to various receivers in order in this way to reduce the mutual destructive interference so that the signal specified for the respective receiver is received by it with good quality.

According to a further development, the transmitter transmits to the receiver information about the channel estimation which has been carried out. This can be utilized in such a way that, after receiving the message, the receiver carries out a processing of the message using a result of the channel estimation. The processing of the message by the receiver using a result of the channel estimation on the transmitter side can take place as an alternative to or in addition to the processing of the message on the transmitter side using a result of the channel estimation.

The transmitter has a transmission unit for transmitting a message in a first step to a forwarding station, and subsequently transmitting the message in a second step to a receiver such that the message reaches the receiver at the same time as the message transmitted to the receiver by the forwarding station.

The transmitter is suitable in particular for carrying out the method, whereby this can also apply to the embodiments and further developments.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
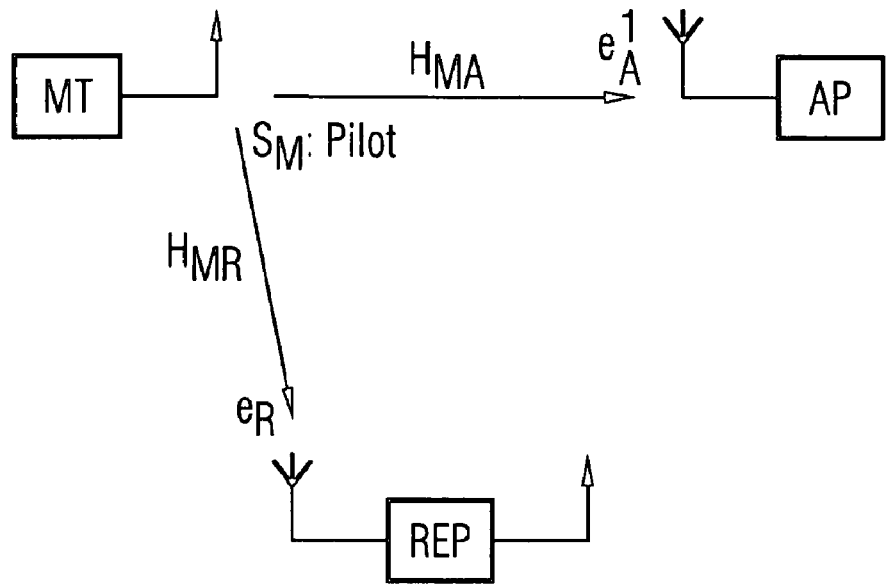
FIG. 1 shows a first step of the method according to one potential embodiment of the invention.

Reference will now be made in detail to the preferred embodiments of the present invention, examples of which are illustrated in the accompanying drawings, wherein like reference numerals refer to like elements throughout.

FIGS. 1 to 4 show a section from a radio communication system, comprising a subscriber station MT (MT: mobile terminal), a radio access point AP (AP: access point) and a repeater REP. Repeaters are radio stations which serve to forward messages, described for example in P. Herhold, E. Zimmermann, G. Fettweis: "Relaying and Cooperation—A System Perspective", Proceedings of the 13$^{th}$ IST Mobile and Wireless Communications Summit (IST Summit), Lyon, France, 27-30 Jun. 2004; P. Herhold, E. Zimmermann, G. Fettweis: "On the performance of cooperative amplify-and-forward relay networks", Proceedings of the ITG Conference on Source and Channel Coding (SCC), Erlangen, Germany, 14-16 Jan. 2004.

Repeaters are used among other things to reduce the infrastructure costs of the radio communication system. Thus, the use of repeaters can reduce the density of radio access points, whereby, depending on the type of radio communication system under consideration, the radio access points can be, for example, base stations of cellular systems or radio access points of local area networks. This is based on the fact that the repeaters enlarge the radio coverage range of the radio access points by forwarding messages from and/or to the radio access points. The extent of the processing at the repeater end of messages to be forwarded may vary. Thus, it is, for example, possible that no processing will take place, i.e. the repeaters are amplify and forward repeaters or transparent repeaters, or it is possible that a decoding and re-encoding will be carried out prior to retransmission. It is assumed hereinbelow that the repeater REP under consideration is an "amplify-and-forward" or transparent repeater.

Figure 3:
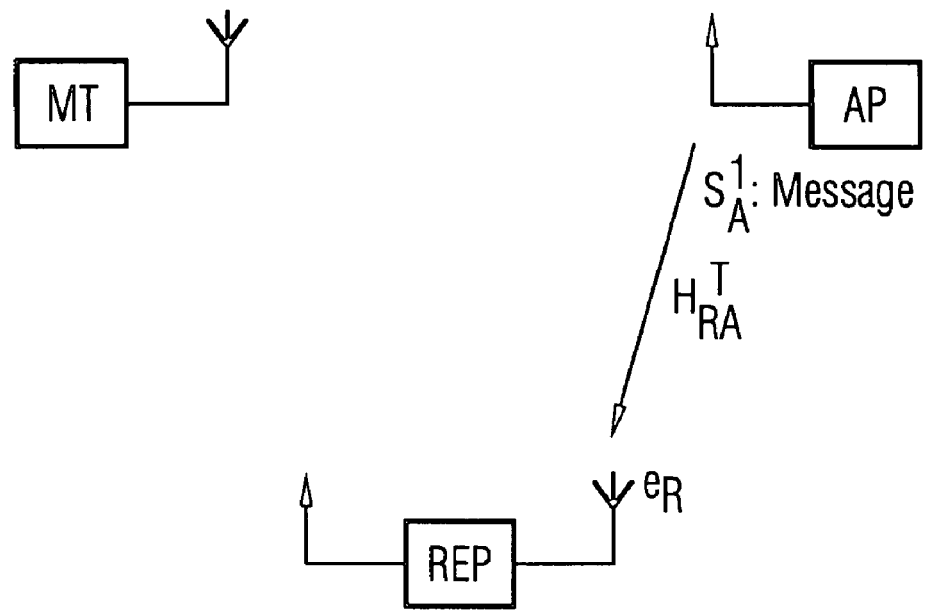
FIG. 3 shows a third step of the method according to one potential embodiment of the invention.
Figure 4:
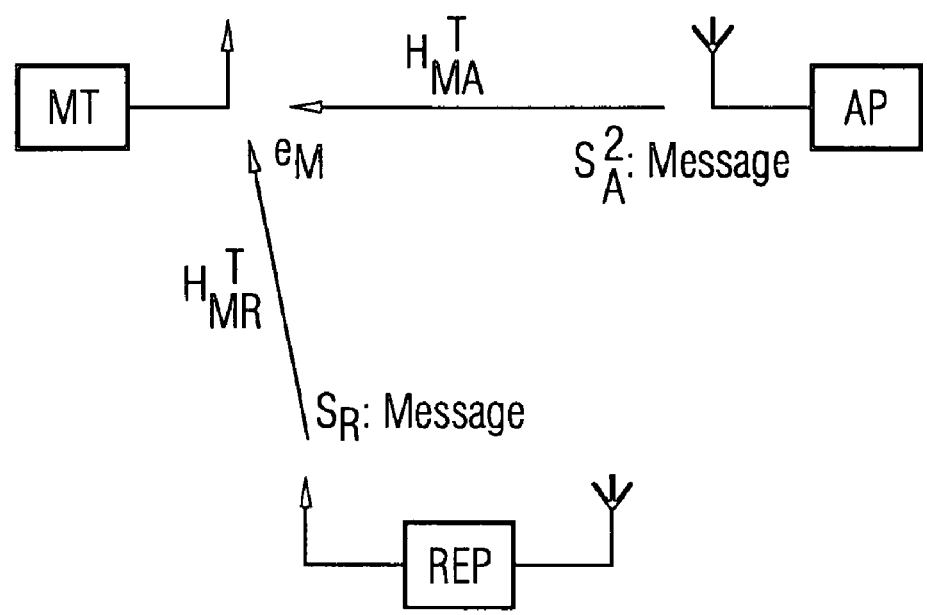
FIG. 4 shows a fourth step of the method according to one potential embodiment of the invention.

The method is arranged in two phases: firstly a message is transmitted in the up-link, i.e. from the subscriber station MT to the radio access point AP, shown in FIGS. 1 and 2, and subsequently a message is transmitted in the down-link, i.e. from the radio access point AP to the subscriber station MT, shown in FIGS. 3 and 4.

In the first step shown in FIG. 1, the subscriber station MT transmits a pilot message PILOT. In FIGS. 1 to 4, transmitted signals are indicated by the letter s and received signals by the letter e. The subscriber station MT transmits the pilot message PILOT in the form of the signal $S_M$. The pilot message PILOT is received by the repeater REP in the form of the signal $e_R$ and by the radio access point AP in the form of the signal $e_A^1$. The radio channel for the transmission of messages from the subscriber station MT to the radio access point AP is designated $H_{MA}$, and the radio channel for the transmission of messages from the subscriber station MT to the repeater REP $H_{MR}$.

Figure 2:
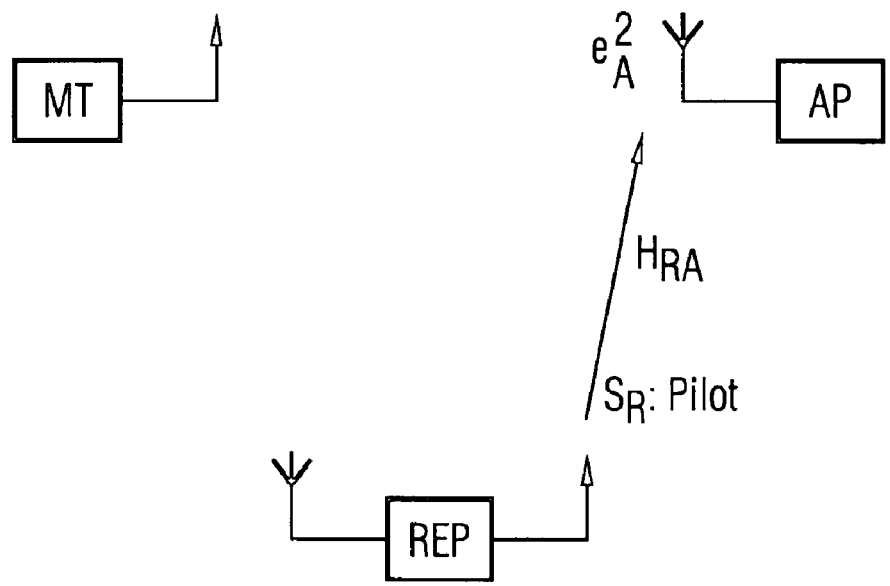
FIG. 2 shows a second step of the method according to one potential embodiment of the invention.

In the second step shown in FIG. 2, the repeater REP transmits the pilot message PILOT in the form of the signal $S_R$. The radio channel for the transmission of messages from the repeater REP to the radio access point AP is designated $H_{RA}$. The pilot message PILOT is received by the radio access point AP in the form of the signal $e_A^2$.

The following relationships exist between the signals transmitted and received in the up-link:

$$e_R = H_{MR} \cdot S_M, \quad e_A^1 = H_{MA} \cdot S_M, \quad e_A^2 = H_{RA} \cdot S_R.$$

The variables H characterizing the various radio channels are generally complex matrixes, and the transmitted and received signals s and e are vectors.

Since the repeater REP is a transparent repeater, $S_R = e_R$ applies. Consequently, the overall signal received by the radio access point AP is given by:

$$e_A = \begin{pmatrix} e_A^1 \\ e_A^2 \end{pmatrix} = \begin{pmatrix} H_{MA} \\ H_{RA} \cdot H_{MR} \end{pmatrix} \cdot s_M = H \cdot s_M$$

The signal $S_M$ transmitted by the subscriber station is known to the radio access point AP since this is the pilot message PILOT. The radio access point AP carries out the channel estimation on the two received signals $e_A^1$ and $e_A^2$ and in this way determines the overall channel matrix H for the radio channel between the subscriber station MT and the radio access point AP in the up-link in relation to the transmission method described.

A message MESSAGE is to be transmitted below from the radio access point AP to the subscriber station MT. To this end, the radio access point AP transmits in a first step in the down-link, shown in FIG. 3, the message MESSAGE in the form of the signal $S_A^1$ to the repeater REP, which receives the message MESSAGE in the form of the signal $e_R$. The radio channel for the transmission of messages from the radio access point AP to the repeater REP is designated $H_{RA}^T$, the matrix $H_{RA}^T$ being the transposed matrix $H_{RA}$.

Subsequently, in a second step, the message MESSAGE is transmitted in the down-link, shown in FIG. 4, in the form of the signal $S_A^2$ from the radio access point AP to the subscriber station MT. The radio channel for the transmission of messages from the radio access point AP to the subscriber station MT is designated $H_{MA}^T$, the matrix $H_{MA}^T$ being the transposed matrix $H_{MA}$. In parallel with the transmission of the message MESSAGE from the radio access point AP to the subscriber station MT, the message MESSAGE is also transmitted from the repeater REP to the subscriber station MT, the repeater REP transmitting the signal $S_R$. The radio channel for the transmission of messages from the repeater REP to the subscriber station MT is designated $H_{MR}^T$, the matrix $H_{MR}^T$ being the transposed matrix $H_{MR}$. The parallel transmission is effected whereby the radio access point AP and the repeater REP transmit the message MESSAGE simultaneously or else with a slight time shift relative to one another such that the subscriber station MT receives a superimposition of the two messages MESSAGE in the form of the signal $e_M$. The size of the admissible shift results inter alia from the channel pulse response and is known to the radio access point AP because of the channel estimation carried out previously. In an OFDM system, the shift should be such that the two messages MESSAGE are received by the subscriber station MT in the same OFDM symbol. Provided the guard period between two adjacent OFDM symbols is large enough, an explicit determination of the shift can be dispensed with.

The following relationships exist between the signals transmitted and received in the down-link:

$$e_R = H_{RA}^T \cdot s_A^1, \quad e_M = H_{MA}^T \cdot s_A^2 + H_{MR}^T \cdot s_R$$

Since the repeater REP is a transparent repeater, $S_R = e_R$ applies. Consequently the overall signal received by the subscriber station MT is given by:

$$e_M = (H_{MA}^T H_{MR}^T \cdot H_{RA}^T) \cdot \begin{pmatrix} s_A^2 \\ s_A^1 \end{pmatrix} = H^T \cdot s_A$$

The overall channel matrix $H^T$ for the down-link in relation to the transmission method described is the transposed overall channel matrix H for the up-link, assuming that the transmit frequencies for down-link and up-link match.

In the method described, for a message to be transmitted from the radio access point AP to the subscriber station MT, the message is transmitted twice by the radio access point AP. According to the related art, for a message to be transmitted from the radio access point AP to the subscriber station MT, only a single transmission of the message by the radio access point AP occurs, which message is then forwarded by the repeater REP to the subscriber station. The advantage of the procedure described, in which the subscriber station MT receives the message as a superimposition of a message transmitted by the repeater REP and a message transmitted by the radio access point AP, is that a reciprocity of the channels in the down-link and in the up-link exists. This means that the overall channel matrix H for the up-link matches the transposed overall channel matrix $(H^T)^T$ for the down-link. This is not the case in respect of message transmission from the radio access point AP to the subscriber station MT according to the related art. According to the related art, reciprocity of the channels in the up-link and in the down-link does not exist in particular also in TDD systems and where there is time-invariant behavior of the transmission channel.

The reciprocity of the channels in the up-link and in the down-link can be used so that the radio access point AP carries out a predistortion in each case prior to the two transmissions of the message, so that no equalization of the superimposed message received from the subscriber station is required. To this end, the radio access point AP uses the channel-estimation result obtained by it based on the steps in the up-link. The result is that it is possible for the subscriber stations of the radio communication system to be equipped more simply. Due to the fact that no outlay is required by the subscriber stations for the channel estimation, the evaluation of signals in the subscriber stations can proceed more rapidly. The predistortion of the messages transmitted by the radio access point AP is carried out such that the changes in the transmitted signal produced by the radio channel are "inversely pre-empted" so that a virtually unadulterated signal reaches the receiver. This can be carried out simultaneously in relation to multiple subscriber stations so that the receiver takes into account the mutual interference of the signals transmitted to different receivers (joint transmission).

A further reason why the quality of the signals received by the subscriber station is improved compared with the related art is that with the proposed method a greater transmit vector is available. Thus the transmit vector, by virtue of the duplicate transmission by the radio access point AP, is composed of the two individual transmit vectors:

$$\begin{pmatrix} s_A^2 \\ s_A^1 \end{pmatrix} = s_A.$$

While this duplicate transmission requires a greater outlay in terms of radio resources, the positive effect of the improved signal quality for the receiver overrides this. This applies in particular where radio transmission conditions are poor.

While in FIGS. 1 to 4 the case is shown where the subscriber station MT and the radio access point AP each have a transmit and receive antenna, the method can preferably also be applied to the case where there are multiple transmit and receive antennae in the transmitter and/or in the receiver (MIMO: multiple input multiple output). Additionally or alternatively, it is also applicable to cases where not just one repeater but a plurality of repeaters forward the messages in parallel from or to the radio access point AP or the subscriber station MT. This leads to a significant improvement in channel characteristics, in particular in MIMO systems.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method for transmitting a communication message by radio from a transmitter to a receiver, comprising:

receiving a preliminary message at the transmitter, the preliminary message being twice-received such that the transmitter receives the preliminary message both directly from the receiver and indirectly from a forwarding station, which was sent the preliminary message from the receiver;

using the twice-received preliminary message to perform a channel estimation;

processing the communication message at the transmitter using a result of the channel estimation;

transmitting the communication message from the transmitter to the forwarding station after the communication message is processed; and after the communication message is received at the forwarding station, transmitting the communication message at the same time from the transmitter and from the forwarding station to the receiver, such that the communication message which the receiver receives from the transmitter upon second transmission by the transmitter at least partially overlaps the communication message which the receiver receives from the forwarding station.

2. The method as claimed in claim 1, wherein the communication message is processed as part of a joint-transmission method.

3. The method as claimed in claim 2, wherein the preliminary message is a pilot signal.

4. The method as claimed in claim 3, wherein the transmitter transmits to the receiver information about the result of the channel estimation.

5. The method as claimed in claim 4, wherein, after receiving the communication message, the receiver processes the communication message using the information about the result of the channel estimation.

6. The method as claimed in claim 1, wherein the transmitter transmits to the receiver information about the result of the channel estimation.

7. The method as claimed in claim 6, wherein, after receiving the communication message, the receiver processes the communication message using the information about the result of the channel estimation.

8. The method as claimed in claim 1, wherein the preliminary message is a pilot signal.

9. A transmitter for transmitting a communication message by radio, comprising:

a receive unit to receive a preliminary message, the preliminary message being twice-received such that the receive unit receives the preliminary message both directly from a receiver and indirectly from a forwarding station, which was sent the preliminary message from the receiver;

an estimation unit to use the twice-received preliminary message to perform a channel estimation; and a processor to process the communication message using a result of the channel estimation;

a transmission unit to:

first, transmit the communication message to the forwarding station, and second, transmit the communication message to the receiver, such that the communication message which the receiver receives from the transmission unit upon second transmission by the transmission unit at least partially overlaps the communication message which the receiver receives from the forwarding station.

10. The transmitter as claimed in claim 9, wherein the transmission unit transmits to the receiver information about the result of the channel estimation.

11. The transmitter as claimed in claim 10, wherein, after receiving the communication message, the receiver carries out a processing of the communication message using the result of the channel estimation.

* * * * *